US012750423B2

(12) United States Patent
Feng et al.

(10) Patent No.: US 12,750,423 B2
(45) Date of Patent: Sep. 29, 2026

(54) METHOD OF CONFIGURING A NETWORK COMPRISING A PLURALITY OF NODE DEVICES, A METHOD OF TRANSMITTING A MESSAGE IN A NETWORK SO CONFIGURED AND A LIGHTING SYSTEM SO CONFIGURED

(71) Applicant: SIGNIFY HOLDING B.V., Eindhoven (NL)

(72) Inventors: Lei Feng, Shanghai (CN); Jaya Valathur Karthik, Bangalore (IN); Changjie Wang, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 174 days.

(21) Appl. No.: 18/683,604

(22) PCT Filed: Jul. 20, 2022

(86) PCT No.: PCT/EP2022/070359

§ 371 (c)(1), (2) Date: Feb. 14, 2024

(87) PCT Pub. No.: WO2023/020774

PCT Pub. Date: Feb. 23, 2023

(65) Prior Publication Data

US 2024/0348688 A1 Oct. 17, 2024

(30) Foreign Application Priority Data

Aug. 17, 2021 (WO) ................ PCT/CN2021/113024
Sep. 28, 2021 (EP) .................................... 21199408

(51) Int. Cl.
*H04L 67/12* (2022.01)

(52) U.S. Cl.
CPC .................................... *H04L 67/12* (2013.01)

(58) Field of Classification Search
CPC ........................................................ H04L 67/12
See application file for complete search history.

(56) References Cited

U.S. PATENT DOCUMENTS 8,515,500 B2 * 8/2013 Das .................. H04W 52/0229 455/574
10,098,201 B1 * 10/2018 Wilson .................... F21V 23/02
(Continued)

FOREIGN PATENT DOCUMENTS

JP 3759928 B2 3/2006
JP 2010233104 A 10/2010
(Continued)

OTHER PUBLICATIONS

Clifone, Antonio, et al., "Wireless Mesh Networking: an IOT-Oriented Perspective Survey On Relevant Technologies," MDPI, Future Internet, www.Mdpi.Com/Journal/Futureinternet, 2019 (35 Pages).

*Primary Examiner* — Javier O Guzman

(57) ABSTRACT

A method of configuring a network comprising a plurality of node devices and a method of transmitting a message in such as network are disclosed. Each node device comprises a long range communication interface and a short range communication interface, the method comprises the steps of: commissioning all of the plurality of node devices to form a single flat network sharing same network credentials and communication resources; dividing the plurality of node devices into a plurality of groups; selecting one or more node devices from each group as delegating node devices for delegating messages from other node devices by way of their long range communication interface(s); and activating the long range communication interfaces of the delegating node devices. When a message is received by a node device in such a network, it first determines whether the message is a time-critical message. The message is transmitted imme-
(Continued)

diately if the message is time-critical. Otherwise the message is transmitted at a specific timeslot different than a timeslot allocated for messages from a neighboring group of node devices, if the message is non-time-critical.

15 Claims, 5 Drawing Sheets

(56) References Cited

U.S. PATENT DOCUMENTS

| | | | | |
|---|---|---|---|---|
| 2012/0143383 | A1 | 6/2012 | Cooperrider et al. | |
| 2014/0089443 | A1 | 3/2014 | Van Gruenen et al. | |
| 2014/0167620 | A1 | 6/2014 | Chobot | |
| 2014/0169335 | A1* | 6/2014 | Franklin | H04W 8/082 370/332 |
| 2016/0063783 | A1* | 3/2016 | Bruns | G01S 5/0295 340/5.61 |
| 2016/0100474 | A1* | 4/2016 | Reh | H05B 41/36 315/320 |
| 2017/0006034 | A1* | 1/2017 | Link, II | H04L 63/08 |
| 2017/0019804 | A1 | 1/2017 | Morchon et al. | |
| 2017/0180953 | A1 | 6/2017 | Hovey et al. | |
| 2017/0200025 | A1* | 7/2017 | Shapiro | G06F 21/629 |
| 2019/0007334 | A1* | 1/2019 | Guim Bernat | H04L 67/1097 |
| 2019/0373472 | A1* | 12/2019 | Smith | H04W 4/38 |
| 2020/0073011 | A1* | 3/2020 | Abboud | G08B 13/184 |
| 2021/0076322 | A1 | 3/2021 | Jiang et al. | |
| 2021/0201333 | A1* | 7/2021 | Rachamadugu | H04L 67/30 |
| 2022/0183133 | A1* | 6/2022 | Camden | H05B 47/115 |

FOREIGN PATENT DOCUMENTS

| | | | |
|---|---|---|---|
| JP | 2016116194 | A | 6/2016 |
| JP | 2016219872 | A | 12/2016 |
| JP | 2017028432 | A | 2/2017 |
| WO | 2015000803 | A1 | 1/2015 |
| WO | 2016075105 | A1 | 5/2016 |

* cited by examiner

METHOD OF CONFIGURING A NETWORK COMPRISING A PLURALITY OF NODE DEVICES, A METHOD OF TRANSMITTING A MESSAGE IN A NETWORK SO CONFIGURED AND A LIGHTING SYSTEM SO CONFIGURED

CROSS-REFERENCE TO PRIOR APPLICATIONS

This application is the U.S. National Phase application under 35 U.S.C. § 371 of International Application No. PCT/EP2022/070359, filed on Jul. 20, 2022, which claims the benefit of International Application No. PCT/CN2021/113024, filed on Aug. 17, 2021 and European Patent Application No. 21199408.2, filed on Sep. 28, 2021. These applications are hereby incorporated by reference herein.

TECHNICAL FIELD

The present disclosure generally relates to the field of transmission of messages in a network, and more specifically, to a method of configuring a network comprising a plurality of node devices, a method of transmitting a message in a network so configured and a lighting system so configured.

BACKGROUND

Electric or electronic devices, such as lighting devices and Internet of Things, IoT, devices, and devices supporting enhanced Machine-Type Communication, eMTC, for example, all of which comprise data communication capabilities, are frequently deployed in networks comprised of a plurality of interconnected devices.

These devices, generally called node devices or terminal devices, typically operate a long range communication interface, such as a network adapter or a transceiver module, for data exchange with remote devices, such as a backend server, and a short range communication interface, such as a transceiver module, for communication between node devices only, also called inter-node device communication.

The long range communication interface may operate in accordance with a wireless mobile communication standard, such as designated 2G/3G/4G/5G cellular communication including Narrowband IoT, NB-IoT, and other long-range wireless communication technologies like Long Range Wide Area Network, LoRaWAN or proprietary communication technologies, for example.

The short range communication interface may operate in accordance with a network protocol for exchanging data by networked devices or nodes, such as designated ZigBee™, Bluetooth™, as well as WiFi based protocols for wireless networks, and wired bus networks such as DALI™ (Digital Addressable Lighting Interface), DSI (Digital Serial Interface), DMX (Digital Multiplex), KNX (and KNX based systems), and proprietary communication technologies and protocols, for example.

Moreover, node devices in many cases are provided with or connected to sensors which enable more advanced applications involving transmission or communication of data and information collected by the sensors.

A lighting system, for example, and in particular an outdoor lighting system such as a street lighting system, may comprise a large number of node devices arranged as lighting fixtures comprising or operatively connected to various sensor, and arranged for operating in a network, such as a mesh network or a network with a star topology, for example.

Typical information exchanged in such a lighting system may comprise time-critical messages exchanged between the node devices and non-time-critical messages exchanged between the node devices as well as with a remote device such as a backend server arranged for managing and controlling the node devices.

As an example, time-critical messages may comprise light on demand messages for providing optimized lighting service to pedestrians and vehicles in response detection of the same by a presence or motion sensor, for example, which require device to device communication with low latency.

On the other hand, non-time-critical messages may comprise for example light management messages for reporting energy consumption of the node devices to the backend server and providing software updates from the backend server to the node devices.

The currently available networks as described above however has difficulty in addressing different requirements posed by both the time-critical and non-time-critical messages in the same network simultaneously.

According to a known method, a large number of node devices are configured into a number of mutually isolated small networks, which makes direct relay of messages between boundary node devices infeasible. As a result, a message to be transmitted across a boundary between two small networks has to be transmitted via for example a remote device by way of node devices with long range communication interface in each small network. This will cause undesirable delay to time-critical messages such as alert message for triggering proper lighting service for pedestrians or vehicles.

US2016100474A1 discloses an apparatus for creating functional lighting groups. A plurality of wireless devices is configured to enter a grouping mode responsive to commands sent over a wireless network by a gateway and forms one or more groups.

Other conventional methods either involve higher communication cost for example by activating long range communication interfaces for each and every node device, or require extra hardware such as segment controllers for each small network.

Therefore, there is a genuine need for a method of configuring a network comprising a large number of operatively interconnected node devices and a method of transmitting messages in such a network, which allows both intra-network messages which are very often time-critical and messages destined to an external device to be handled and transmitted reliably and efficiently to respective destinations, while keeping the network configuration procedure simple and the communication cost reasonably low.

SUMMARY

In an aspect of the present disclosure, there is presented a method of configuring a network comprising a plurality of node devices, each node device comprising a long range communication interface and a short range communication interface, the method performed by a commissioning device and comprising the steps of:

- commissioning all of the plurality of node devices to form a single flat network sharing same network credentials and communication resources;
- dividing the plurality of node devices into a plurality of groups;

selecting one or more node devices from each group as delegating node devices for delegating messages from other node devices by way of their long range communication interface; and activating the long range communication interfaces of the delegating node devices.

The present disclosure is based on the insight that organizing a large number of node devices having both long and short range communication interfaces as a single flat network makes it possible to transmit and exchange messages reliably and efficiently between the node devices in the network as well as with other devices external to the network such as a backend server deployed on the cloud.

Configuring the large number of node devices as a single flat network allows all node devices to have the possibility of communicating with any other node devices by way of the short range communication interfaces of the node devices. Besides, a node device in a group of node devices selected to function as a delegating node device allows messages between other node devices and a remote device to be delegated via the long range communication interface of the delegating node device.

The method is performed by a commissioner device, which can be a server, a mobile commissioning device or a node device in the network which is already commissioned.

The method comprises a regular step of commissioning the node devices into a single flat network, such as a mesh network, which enables all node devices to have a potential of communicating with other node devices via their short range communication interfaces. The further steps of grouping the node devices into multiple groups and selecting at least one delegating node device from each group and activating long range communication interfaces of the selected delegating node devices do not involve complicated operations nor require additional hardware devices.

In comparison to convention methods which configure networks into other topology or using small networks, the configuration method of the present disclosure remains simple and easy to implement. Besides, message transmission within the network is done via available message routing techniques and does not require any modification to communication protocols. Any node to node communication latency is low as no inter small network communication is needed. Furthermore, the communication cost is kept reasonable low as only a limited number of delegating node devices perform long range communication. In an example of the present disclosure, the step of selection is performed based on geographic locations of the plurality of node devices in the flat network.

It can be contemplated by those skilled in the art that groups of the node devices and a respective delegating node device in each group may be decided and selected based on the geographic locations of the node devices in the flat network. It helps to ensure that appropriate grouping of the node devices and suitable delegating node devices are used, which is beneficial for the effective transmission of messages in the network.

It is noted that the groups here are loosely coupled with the selected delegating nodes. As an example, an uplink message from a node device to the backend server may be delegated by any delegating device available to perform the delegating function. As for a downlink message, the backend server may select a delegating device to transmit the message to the destination node device.

The geographic locations of the node devices in the flat network are readily available to for example a backend management server, and can be easily downloaded to a commissioner device performing the commissioning of the network. The grouping and selection of the delegating node devices can therefore be done easily.

In an example of the present disclosure, the step of activating comprises activating the long range communication interfaces by transmitting an instruction to the delegating node devices or a management console of the delegating node devices.

The delegating node devices may have their long range communication interfaces activated based on the received instruction. This is a simple operation and cost limited communication resources as only a number of node devices are selected as the delegating node devices.

In addition to activating the long range communication interface of a delegating node devices, a SIM card of that node device should be activated as well. For example, a mobile network operator usually provides an API to active or de-active the SIM card.

In an example of the present disclosure, the method further comprises the step of updating or optimizing one or more of the selected delegating node devices based on runtime conditions in the flat network.

The update or optimization enables adaption of the selection of the delegating node devices based on real runtime environment in the network. The method as disclosed by the present disclosure is therefore more flexible and can adapt to changing network conditions as needed.

The backend server, which has an overview of the runtime conditions of the network node devices, can update or optimize the selection of the delegating node devices as needed based on changed conditions in the network.

As only limited number of node devices are selected as the delegating node devices, the updating and optimization help to prevent any communication failure that may arise due to faulty devices at little cost for communication resources and time.

In an example of the present disclosure, the runtime conditions in the flat network comprise at least one of quality of service measured on communication channels between the node devices within the network or with a remote device, and maintenance requirement of a selected delegating node device.

It can be contemplated by those skilled in the art such runtime conditions can influence communication of the messages in the network, which may be easily used as indications for updating and optimization of the delegating node device.

In an example of the present disclosure, the method further comprises the step of allocating different timeslots for transmitting messages by node devices of neighboring groups.

This ensures that messages from node devices in a group that have to be transmitted either directly or by their respective delegating node devices are transmitted at different timeslots. It helps to balance traffic in the network and reducing undesired interference between messages.

In an example of the present disclosure, the step of allocating is based on geographic locations of node devices in neighboring groups.

The allocation is actually based on the grouping of the node devices, which is straightforward and requires no further information. This can be done at the same time when the node devices are grouped and/or the delegating node devices are selected.

Moreover, the allocation of timeslots is optimized based on signal strength received by a node devices from node devices in the neighboring group measured in real-time.

Updating allocation of timeslots allows more flexibility as it is done based on real-time measurement. It can therefore provide allocation of timeslots which suits the condition in the network in a better way.

A second aspect of the present disclosure provides a method of transmitting a message in a network configured using the method according to the first aspect of the present disclosure. The network comprises a plurality of operatively interconnected node devices, each node device comprising a long range communication interface and a short range communication interface, the method is performed by a receiving node device in a group of node devices and comprises the steps of:

- determining whether a received message is a time-critical message;
- transmitting the received message immediately if it is determined that the received message is a time-critical message; and
- transmitting the received message at a specific timeslot, the timeslot being different than a timeslot allocated for messages from neighboring groups of node devices, if it is determined that the message is a non-time-critical message.

In a network configured as described in the first aspect of the present disclosure, intra-network communication and communication with devices external to the network, which both may be time-critical or non-time-critical, are handled efficiently and reliably.

Time-critical messages, such as light on demand messages or a failure report message, require short latency in its transmission and therefor have to be transmitted right away. When a message is determined to be a time-critical message, the node device will transmit the received message immediately. When the received message is determined to be non-time-critical, it will be transmitted at a timeslot specifically allocated for messages from a group comprising the receiving node device. This specific timeslot is different than a timeslot allocated for messages from neighboring groups of node devices.

Having node devices in neighboring groups transmitting messages at different timeslots is beneficial as it prevents non-time-critical messages of node devices from neighboring groups from being transmitting simultaneously, therefore helping to reduce interference between messages transmitted by the node devices in neighboring groups.

Low latency required by time-critical message is therefore guaranteed, especially for time-critical light on demand messages, comparing to the traditional architecture of separated or isolated small networks comprised in a large network of node devices.

In the meantime, by transmitting non-time-critical message at a timeslot specifically allocated to messages from a group comprising the receiving node device, traffic in the network is balanced and undesired interference between messages is reduced.

In an example of the present disclosure, determining whether a received message is a time critical message comprises checking a specific indicator comprised in the received message.

It can be contemplated by those skilled in the art that an indicator as to whether the message is time-critical or not may be added to a data frame comprising the message. Depending on the used protocol, the indicator may be added to for example a MAC header or application data of a MAC frame, or a reserved field in a network layer frame. The indicator can be a single bit, which introduces little or no extra payload and can be processed efficiently.

In an example of the present disclosure, transmitting the received message immediately comprises transmitting the received message by way of its short range communication interface, if the received message is destined to a node device within the network.

Whether the received message is destined to a node device within or external to the network may be determined based on a destination field of the received message. When the message is an intra-network message or inter-node message, it is transmitted using the short range communication interface of the receiving node device, allowing relay function between node devices in the network to be used.

In an example of the present disclosure, transmitting the received message immediately comprising transmitting the received message by way of delegation via a delegating node device using its long range communication interface, if the received message is destined to a device external to the network.

When the received message is destined to a device external to the network, the received message, in contrast, will be transmitted via a delegating node device, through its long range communication interface.

It is noted such a message may be delegated by a delegating node device in the same group as the node device receiving the message or by a delegating node device in a neighboring group. This helps to ensure that the message to an external device is reliably transmitted.

The above described method is especially beneficial when applied to a lighting system involve many lighting devices, such as in an office building or on a highway. The lighting devices have to transmit both intra-network messages, such as light on demand messages triggered by the detection of a vehicle or a pedestrian which are often time-critical, and messages destined to an external device, such as lighting usage management messages for reporting energy usage. Both type of messages can be transmitted by the method in an efficient, reliable and cost effective way.

A third aspect of the present disclosure a lighting system comprising a plurality of lighting fixtures, each lighting fixture comprising a long range communication interface and a short range communication interface, the plurality of lighting fixtures configured into a network by the method according to the first aspect of the present disclosure, and messages in the lighting system are transmitted according to the method according to the second aspect of the present disclosure.

A fourth aspect of the present disclosure provides a computer program product, comprising a computer readable storage medium storing instructions which, when executed on at least one processor, cause the at least one processor to carry out the method according to the first aspect of the present disclosure.

A fifth aspect of the present disclosure provides a computer program product, comprising a computer readable storage medium storing instructions which, when executed on at least one processor, cause the at least one processor to carry out the method according to the second aspect of the present disclosure.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Embodiments contemplated by the present disclosure will now be described in more detail with reference to the accompanying drawings. The disclosed subject matter should not be construed as limited to only the embodiments set forth herein. Rather, the illustrated embodiments are provided by way of example to convey the scope of the subject matter to those skilled in the art.

The present disclosure is detailed below with reference to a network of a plurality of lighting devices functioning as node devices of the network. Those skilled in the art will appreciate that the present disclosure is not limited to a network of lighting devices, but is applicable for networks of a wide variety of node devices enabled with network communication connectivity, as indicated in the background part.

The terms "node device", "lighting device" and "lighting fixture" are used interchangeably in the following description.

Figure 1:
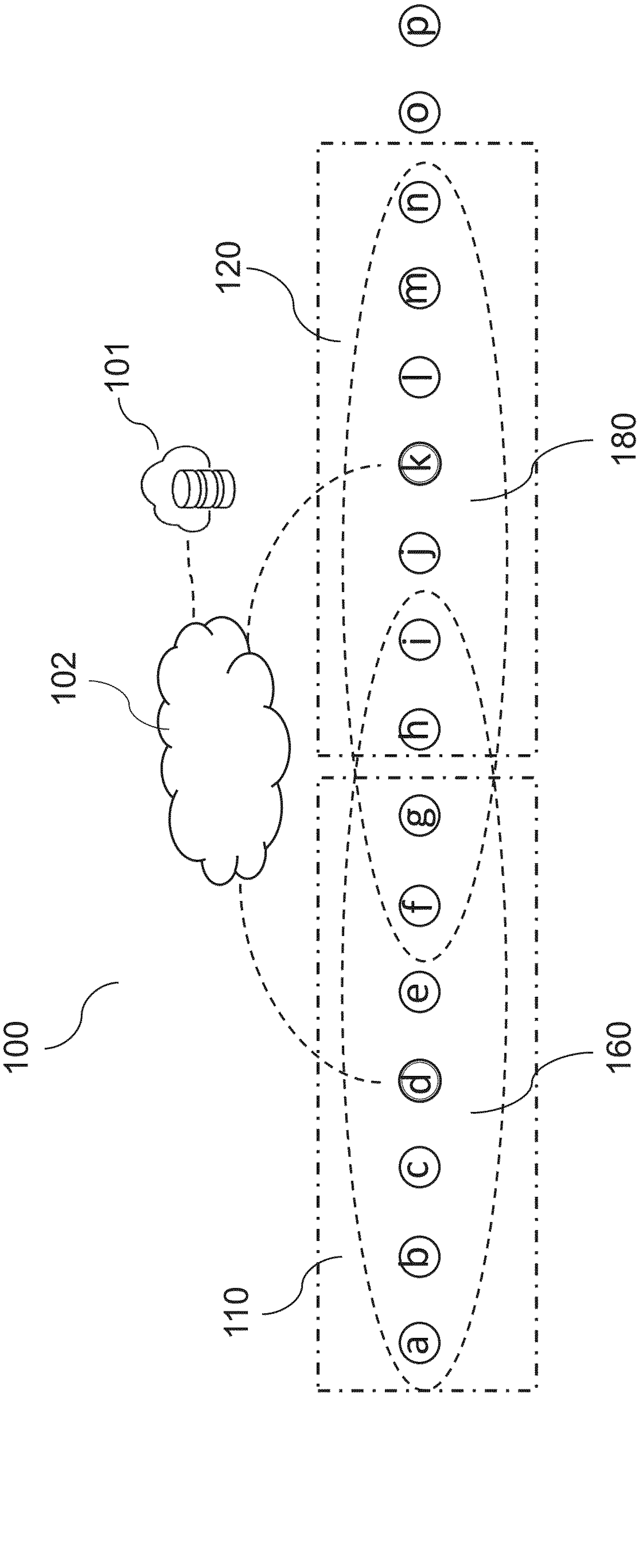
FIG. 1 schematically illustrates a network comprising a plurality of node devices deployed as a flat network, in accordance with the present disclosure.

FIG. 1 schematically illustrates a network 100 comprising a plurality of node devices deployed as a flat network, in accordance with an embodiment of the present disclosure.

The network 100 may be a lighting system comprising a plurality of lighting devices or lighting fixtures a-p, which function as node devices of the network 100. Each lighting device comprises or is configured to operate a long range communication interface and a short range communication interface. The long communication interface is configured for communication with a remote device, such as a backend server 101 deployed on the cloud 102. The short range communication interface is arranged for communications between node devices in the network, which is also referred to as inter-node communications.

Although only lighting devices a-p are illustrated in FIG. 1, real life application scenarios may comprise a lighting system comprising a large number of lighting devices such as thousands of lighting fixtures or even more, deployed along a highway or in an office or factory building.

The lighting devices a-p may comprise or be operatively connected to one or more sensing devices, such as a motion sensor, an imaging device and the like, for providing intelligent service such as light on demand service or surveillance service.

All node devices in the network 100 are configured or organized as a flat network. A flat network as used in the present disclosure refers to a network topology where the node devices comprised in the network are not connected hierarchically or segmented or separated into different communication areas or small networks. Instead, all node devices have potentials to communication with each other, based on a same communication protocol, by using for example their short range communication interfaces. An example of a flat network may be a Bluetooth mesh or ZigBee network.

It will be described in the following that the node devices in the flat network 100 are divided into a plurality of groups such as groups 110 and 120 illustrated in FIG. 1, which will facilitate efficient communication of messages within the network 100 and with external devices, such as a backend server 101 deployed on the cloud 102.

Figure 2:
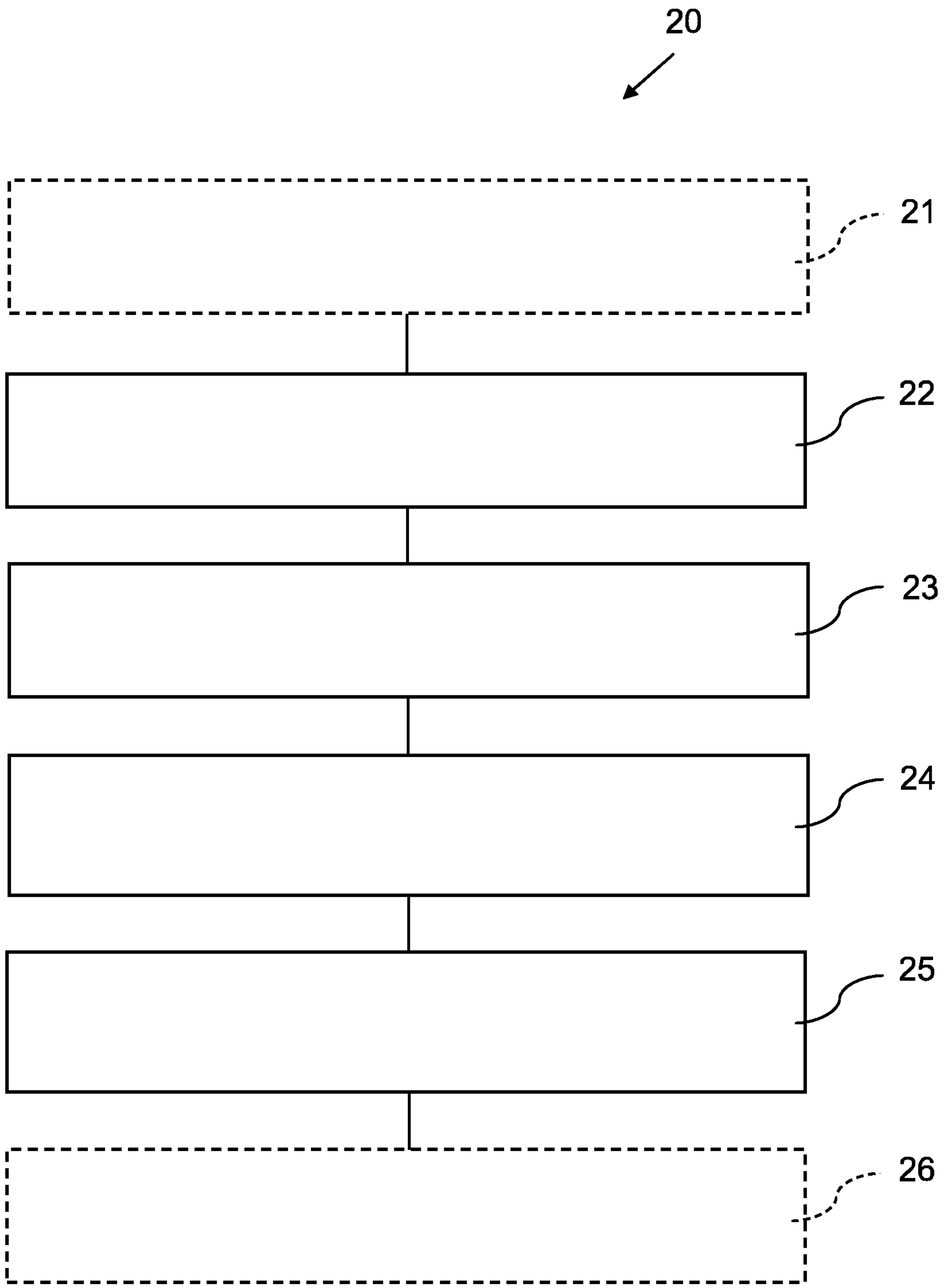
FIG. 2 schematically illustrates, in a flow chart type diagram, an embodiment of a method of configuring a plurality of node devices into a flat network as illustrated in FIG. 1, according to the present disclosure.

FIG. 2 schematically illustrates, in a flow chart type diagram, an embodiment of a method 20 of configuring a plurality of node devices into a flat network 100 as illustrated in FIG. 1, according to the present disclosure.

The method is performed by a commissioner device, which may be a standalone device such as a mobile device or implemented as a software module on a remote control or on a management server and a management server.

At step 21, all node devices are installed and connected with necessary hardware facilities, for example based on a construction plan view.

At step 22, the node devices are commissioned into a flat network. The commissioning of the node devices into a flat network 100 as illustrated in FIG. 1 may be performed according to a conventional method known to those skilled in the art.

As an example, a commissioner device may join each node device into the flat network by communication with the node device directly via its short range communication interface or remotely via delegation of one or more already commissioned node devices having their long range communication activated.

All node devices commissioned in such a way share same network credentials and communication resources such as a same network key and a same communication channel, which allows each node device to have the potential of communicating with any selected node devices in the network by using short range wireless communication.

At step 23, the node devices are divided into a plurality of groups, with each group comprising for example tens of node devices.

At step 24, a node device is selected from each group as a delegating node device for delegating messages between a remote device and other node devices.

It can be contemplated by those skilled in the art that the grouping of node devices and the selection of the delegating node device in each group may not necessarily be performed in two separate steps and/or in a specific order.

As an example, two groups 110 and 120 of node devices illustrated in FIG. 1 by dash-dotted square are to be formed, with node d and k respectively in group 110 and 120 to be selected to operate or function as the delegating node device for other node devices in the same group or in neighboring groups, for exchanging information with for example a remote device. It is noted that the grouping is for illustrative purpose only. A person skilled in the art will understand that a large number of groups may be needed to cover all node devices deployed in a flat network.

In practice, the groups 110 and 120 may be decided first and then the nodes d and k from each group 110 and 120 selected or chosen as the delegating node device of the groups 110 and 120. Alternatively, the node devices d and k may be designated as delegating node devices first and then a number of node devices in the neighborhood of each delegating node device is virtually grouped into groups 110 and 120.

In both cases, the node devices in the flat network 100 are grouped, and a node device within each group is selected to delegate messages originated from or destined to other node devices within communication range of the selected node device.

It can be contemplated by those skilled in the art that more than one node device in each group may be selected as delegating node devices, depending on conditions such as a number of node devices in each group and so on.

It can be contemplated by those skilled in the art that a group might be a virtual group. In this sense, a certain node is not necessarily bound to only one delegating node device, as can be seen from FIG. 1. In FIG. 1, messages transmitted by node devices f, g, h and I can be delegated by either node d or k. This helps to increase the system reliability.

It is seen from the above description that the delegating node devices d and k are selected during a commissioning and configuration phase of the network, by the commissioner device. The selection may be performed based on geographic locations of the node devices a-p in the network 100. Node devices located geographically or communicatively adjacent or close to each other may be allocated into a group, with one of them located at a relatively central location or being communicatively more accessible to other node devices in the same group being selected as the delegating node device.

At step 25, long range communication interfaces of the selected node devices are activated, which allows the selected node devices to delegate messages to and from other node devices, during an operation phase of the network.

The activation may be performed by transmitting an activation instruction or command to the selected node devices or to a management console of the delegating node devices.

It can be contemplated by those skill in the art that the activation step 25 is not necessarily performed after the dividing and selecting steps 23 and 24. In practice there may be a case where all nodes initially already have their long range communication interface activated first. Afterward, those node devices not requiring long range communication functions can close or disactivate their long range communication interface after commissioning and configuration.

Optionally, at step 26, the selection of the node devices is updated or optimized by the backend server based on varying network conditions at a runtime or operation phase of the network. Network conditions may relate to for example maintenance or repairing requirement of one or more node devices, connectivity failure, quality of service measured for communication links between node devices as well as with the remote device. Such updating and optimization help to reduce undesired communication disruption and ensure better efficiency of communication.

In the flat network 100 of FIG. 1, which is configured according to the method 20 described above, all node devices share same credentials, such as a same network key and same application keys, and operate on a same frequency according to at least one same communication protocol. Therefore, all the node devices may talk to each other, for example by way of relay of a number of relaying node devices using their short range communication interfaces, without the need of the backend server to bridge between them.

The configuration of all the node devices a-p as the flat network 100 therefore allows timely transmission of so-called intra-network messages which are very often time-critical, such as light on demand trigger messages requiring short latency or delay, to be performed across the network 100 without unnecessary delay.

On the other hand, the delegating node devices in each group operate to transmit messages to and from devices external to the network, such as messages required by lighting management applications, to and from for example the backend server 101 via their long range communication interfaces.

As only a limited number of node devices operate the long range communication interfaces, cost of communication can be kept low, while communication of each node device with external entities is still ensured.

As the network 100 is a flat network in terms of short-range wireless communications, the different groups such as group 110 comprising node a-g and group 120 comprising node h-n are not isolated.

For the purpose of improving the system robust, physical communication coverage, as illustrated by dashed ellipses 160 and 180 in FIG. 1, of the delegating node devices d and k in different groups are usually larger than their virtual scopes 110 and 120. As a result, the groups in the flat network 100 are usually overlapped in terms of their physical communication coverage.

This redundancy is beneficial as it helps to ensure that a message to be transmitted to an external device can be reliably delegated. On the other hand, the overlap between neighboring groups may impact communication in the neighboring groups, especially in the situation of many groups of node devices, and when the number of messages to be transmitted is relatively large.

Taking the groups 110 and 120 of FIG. 1 as an example, the node device d is usually designed for delegating messages to/from node devices a to g of group 110 and the node device k for delegating messages to/from node devices h to n in group 120. However, a message from the node device k to the node device h in the same group 120 may also reach a node device f in the neighboring group 110 that is taken care by the node device d. This is undesirable when traffic to be handled by the node device d is large.

Figure 3:
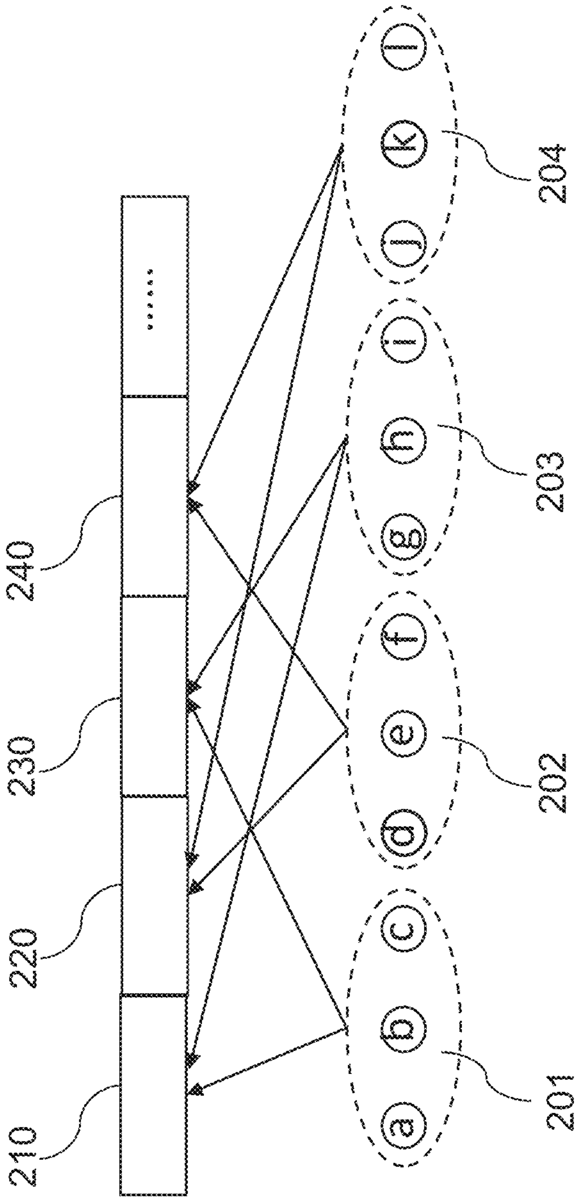
FIG. 3 schematically illustrates allocating non-time-critical communications in neighboring groups into different timeslots, in accordance with the present disclosure.

In order to alleviate the impact of the overlapped group, the non-time-critical communications from node devices in different groups are allocated into different timeslots, which is illustrated in FIG. 3.

Four groups 201-204 are illustrated in FIG. 3, with each group comprising three node devices, and a center device b, e, h and k of each group selected as a delegating node device in the group.

To prevent messages from neighboring groups from interfering with each other, messages transmitted by the node devices in neighboring groups are allocated into different timeslots.

As illustrated in FIG. 3, non-time-critical messages from group 201 are allocated into timeslots 210 and 230, while non-time-critical messages from group 202 are allocated into timeslots 220 and 240.

As groups 201 and 203 are not neighboring each other, non-time-critical messages to be transmitted by the node devices b and h may be allocated into the same time slots 210 and 230. The same is true for groups 202 and 204.

It can be contemplated by those skilled in the art the timeslots for messages from different groups may be easily allocated when the node devices are grouped and/or when the delegating node devices are selected. In this sense, the overlapped or neighboring groups can be decided with reference to the geographic position of the node devices. The allocation of timeslots may also be performed based on measurement performed during the runtime. Furthermore, the allocated timeslots may be optimized during runtime.

Specifically, a node device in the network may perform statistic on messages it receives from different message initiators, and send a list of the message initiators to the backend server. Based on information from some or all node devices in the lighting system, the backend server can makes a decision as to which groups are overlapped and allocate different timeslots for overlapped or neighboring groups accordingly.

On the other hand, if node devices in a group A often detect or receive messages from node devices in a group B, it shows that there is much interference between group A and group B. Therefore, different timeslots should be allocated to the two groups A and B.

Such an allocation of timeslots prevents non-time-critical messages transmitted by node devices from neighboring groups from being transmitting simultaneously, and therefore helps to reduce interference between messages transmitted by the node devices in neighboring groups.

The above described allocation of timeslots for messages transmitted by the node devices in different groups may be considered as a supplementary step to the method of configuring the flat network. It helps to balance traffic of communication in the network and consequently alleviate message collisions.

The timeslot allocation is only for non-time-critical messages. Therefore, time-critical messages such as a failure report message or a light on demand message triggered by a pedestrian detected by a sensor can still benefit from the flat network and be exchanged with the backend server or other node devices at any time.

Figure 4:
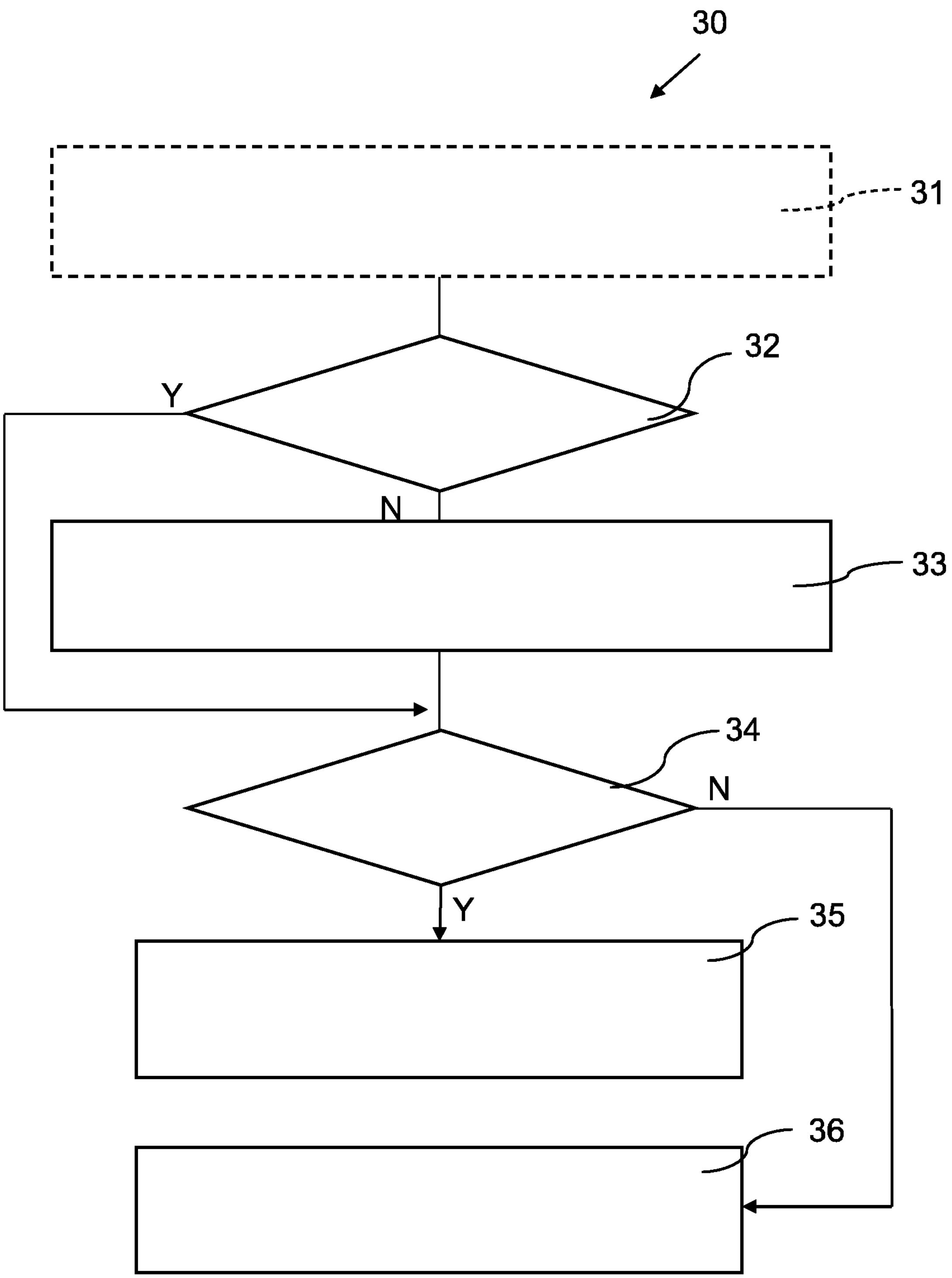
FIG. 4 schematically illustrates, in a flow chart type diagram, an embodiment of a method of transmitting messages in a flat network of operatively interconnected node devices according to the present disclosure.

FIG. 4 schematically illustrates, in a flow chart type diagram, an embodiment of a method 30 of transmitting messages in a flat network of operatively interconnected node devices according to the present disclosure. The flat network is configured as described above such that both intra-network and messages exchanged with an external device can be communicated across the network and to/from a remote device in an efficient and reliable manner.

The method is performed by any one of the node devices in the network, which can be a non-delegating node device or a delegating node device in a group of node devices.

At step 31, the node device receives a message. As an example, the message may be received from another node device and serves the purpose of triggering for example a lighting level suitable for an approaching moving pedestrian or vehicle. As another example, the message may comprise an energy usage message to be transmitted to a backend server.

It can be contemplated by those skilled in the art that the message may be received by the node device via its short range communication interface or long range communication interface, depending on a source device of the message.

There is also a scenario where the node device is the one detecting a moving object and therefore “prepare” a message for triggering other node devices to light up. This may also be considered as “receiving” a message for the purpose of the present disclosure.

At step 32, the node device determines whether the received message is time-critical or not.

The indication as to whether the message is time-critical or not may be comprised for example in a data frame comprising the message. Depending on a communication protocol used for transmitting the message, an indicator may be added to the corresponding data frame conveniently.

As an example, reserved bits in the frame control field of a ZigBee network layer frame may be used to indicate as to whether the message is time-critical or not. The indicator may also be inserted into the network command identifier list of a network command conveniently.

Alternatively, the indicator may be added to for example a MAC header or application data of a MAC frame. In this case, the determination as to whether the message is time-critical or not is performed even more efficiently.

The receiving node device checks the indicator as comprised in the received data frame and decides if the message should be transmitted or relayed immediately.

If it determined at step 32 that the received message is non-time-critical, at step 33, the received message is transmitted at a timeslot allocated for the group comprising the delegating node device. This normally involves waiting for a timeslot assigned specifically for the group comprising the receiving node device.

Therefore, node devices of groups neighboring each other are scheduled to transmitted non-time-critical messages at different timeslots. This not only balances traffic over the network but also helps to reduce undesired packet loss that may happen due to limited available network resources.

In the case that it is determined at step 32 that the received message is time-critical, such as a message reporting a power failure or any other situation that has to be handled right away, the message has to be transmitted immediately without any delay. It therefore ensures for example that any faulty situation is dealt with in time.

A time-critical message is transmitted in different ways, depending on whether the message is destined to a further node device in the network, also referred to as an intra-network or inter-node message, or to a device external to the network.

Therefore, following determining at step 32 that the received message is time-critical, at step 34, it is determined whether the received message is an intra-network message.

The indication as to whether an intra-network message or to a device external to the flat network may be determined according to a conventional method, by for example referring to a certain field of a data frame comprising the message.

In the case that it is determined at step 34 that the received time-critical message is an intra-network message or destined to a node device within the flat network, at step 35, the received message is transmitted by the node device by way of its short range communication interface.

It can be contemplated by those skill in the art that the transmission may be done using flooding or routing techniques, which will not be elaborated here.

On the other hand, if it is determined at step 34 that the received time-critical message is destined to a device external to the flat network, at step 36, the received message is transmitted by way of delegation via a delegating node device, which may be a delegating node device in same group as the node device or in for example a neighboring group.

It can be contemplated by those skilled in the art that transmitting a time-critical message by way of delegation via a delegating node device may comprise transmitting the time-critical message destined externally of the network to a delegating node device using their short range communication interfaces, if the receiving node devices is not one of the delegating node devices.

In the case that the receiving node device in itself is a delegating node device, it can transmit the time-critical message destined externally of the network directly via its long range communication interface.

Figure 5:
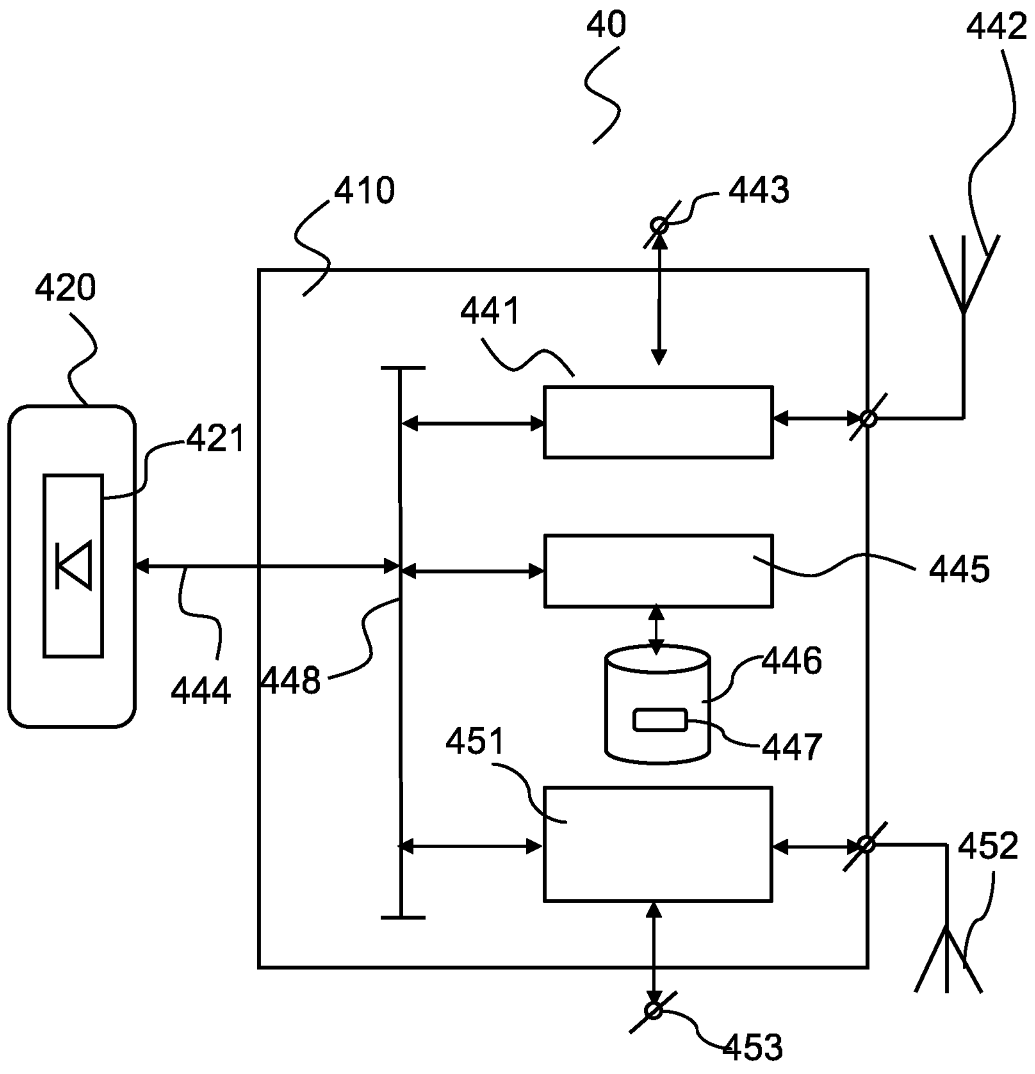
FIG. 5 schematically illustrates an embodiment of a node device arranged for operating in a network of operatively interconnected node devices, in accordance with the present disclosure.

FIG. 5 schematically illustrates an embodiment of a node device 40 arranged for operating in a network of operatively interconnected node devices, configured in accordance with the present disclosure.

The node device 40 comprises a control part or control device 410 and a load such as a lighting fixture or lighting device 420, comprising a lighting module 421, preferably a Light Emitting Diode, LED, lighting module or a plurality of LED lighting modules, operation of which may be controlled by the control device 410 from or through a remote control device, such as a remote or backend server (not shown), for example.

The control device 410 operates a long range communication interface 441, such as a first network adaptor or a transceiver, Tx/Rx 1, module, arranged for direct wireless message exchange or data packets 442 with a remote control device or backend server. The long range communication interface 441 typically operates according to a mobile communication system technology in a licensed frequency band, such as 2G/3G/4G/5G cellular communication, and other long-range wireless communication technologies, such as known as Long Range Wide Area Network, LoRaWAN, and Narrowband IoT, NB-IoT, communication, for example. However, the long range communication interface 441 may also operate according to a proprietary wireless communication protocol or technology.

The long range communication interface 441 may also be arranged for wired message exchange 443, such as for data exchange over an Ethernet connection and the Internet, or the like.

The control device 410 further operates a short range communication interface 451, such as a second network adapter or transceiver, Tx/Rx 2, module arranged for short-range wireless 452 or wired 453 exchange of messages or data packets with another node device in the network, i.e. so called inter-node device communication. Network protocols for exchanging data by networked devices or nodes may comprise ZigBee™, Bluetooth™, as well as WiFi based protocols for wireless networks, and wired bus networks such as DALI™ (Digital Addressable Lighting Interface), DSI (Digital Serial Interface), DMX (Digital Multiplex), and KNX (or KNX based systems), and other proprietary protocols.

The control device 410 further comprises at least one microprocessor, μP, or controller 445, and at least one data repository or storage or memory 446, among others for storing address information of the node device itself and other node devices, such as identifiers 447, IDs, Media Access Control, MAC, addresses and subscriber information of node devices. The repository 446 also stores a network credential for a network comprising the node device 40. Instead of the repository 446, a separate memory or storage accessible to the at least one processor or controller 445 may be provided.

The at least one microprocessor or controller 445 communicatively interacts with and controls the long range communication interface 441, the short range communication interface 451, and the at least one repository or storage 446 via an internal data communication and control bus 448 of the control device 410.

When the node device 40 is deployed in a flat network as described with reference to the present disclosure, the at least one microprocessor or controller 445 may operate to perform the method of transmitting messages in the flat network described above.

The lighting fixture or lighting device 420 connects 444 to and is controlled from the data communication and control bus 448 by the at least one microprocessor or controller 410.

Those skilled in the art will appreciate that any electric load may be connected 444 to the control bus other than or in addition to a lighting fixture or lighting device 420, such as an access point device or a geographic routing device.

The present disclosure is not limited to the examples as disclosed above, and can be modified and enhanced by those skilled in the art beyond the scope of the present disclosure as disclosed in the appended claims without having to apply inventive skills and for use in any data communication, data exchange and data processing environment, system or network.

The invention claimed is:

1. A method of configuring a network comprising a plurality of node devices, each node device comprising a long range communication interface and a short range communication interface, the method performed by a commissioning device and comprising:

commissioning all of the plurality of node devices to form a single flat network sharing same network credentials and communication resources via short range communication interfaces;

dividing the plurality of node devices into a plurality of groups;

selecting one or more node devices from each group as delegating node devices for delegating messages from other node devices by way of long range communication interface(s) of the one or more node devices; and activating the long range communication interfaces of the delegating node devices, so that the long range communication interfaces of the delegating node devices and short range communication interface can work at the same time.

2. The method according to claim 1, wherein the step of selection is performed based on geographic locations of the plurality of node devices in the flat network.

3. The method according to claim 1, wherein the step of activating comprises activating the long range communication interfaces by transmitting an instruction to the delegating node devices or to a management console of the delegating node devices.

4. The method according to claim 1, further comprising the step of updating or optimizing one or more of the selected delegating node devices based on runtime conditions in the flat network.

5. The method according to claim 4, wherein the runtime conditions in the flat network comprise at least one of quality of service measured on a communication channel between node devices within the network or with a remote device, and maintenance requirement of a selected delegating node device.

6. The method according to claim 1, further comprising the step of allocating different timeslots for transmitting messages by node devices of neighboring groups.

7. The method according to claim 6, wherein the step of allocating is based on geographic locations of node devices in neighboring groups.

8. The method according to claim 6, wherein the allocation of timeslots is optimized based on signal strength received by node devices from node devices in the neighboring group measured in real-time.

9. A method of transmitting a message in a network configured using the method according to claim 1, the network comprising a plurality of operatively interconnected node devices, each node device comprising a long range communication interface and a short range communication interface, the method is performed by a receiving node device in a group of node devices and comprising:

determining whether a received message is a time-critical message;

transmitting the received message immediately if it is determined that the received message is a time-critical message; and transmitting the received message at a specific timeslot, the timeslot being different than timeslots allocated for messages from neighboring groups of node devices, if it is determined that the message is a non-time-critical message.

10. The method according to claim 9, wherein determining whether a received message is a time critical message comprises checking a specific indicator comprised in the received message.

11. The method according to claim 9, wherein transmitting the received message immediately comprises transmitting the received message by way of its short range communication interface, if the received message is destined to a node device within the network.

12. The method according to claim 9, wherein transmitting the received message immediately comprising transmitting the received message by way of delegation via a delegating node device using its long range communication interface, if the received message is destined to a device external to the network.

13. A lighting system comprising a plurality of lighting fixtures, each lighting fixture comprising a long range communication interface and a short range communication interface, the plurality of lighting fixtures configured into a network by a commissioner device, the commissioner device configured to:

commission all of the plurality of node devices to form a single flat network sharing same network credentials and communication resources via short range communication interfaces;

divide the plurality of node devices into a plurality of groups;

select one or more node devices from each group as delegating node devices for delegating messages from other node devices by way of long range communication interface(s) of the one or more node devices; and activate the long range communication interfaces of the delegating node devices, so that the long range communication interfaces of the delegating node devices and short range communication interface can work at the same time.

14. A non-transitory computer readable storage medium storing instructions which, when executed on at least one processor, cause said at least one processor to carry out the method according to claim 1.

15. A non-transitory computer readable storage medium storing instructions which, when executed on at least one processor, cause said at least one processor to carry out the method according to claim 9.

* * * * *